United States Patent
Thompson et al.

[11] Patent Number: 6,143,688
[45] Date of Patent: Nov. 7, 2000

[54] METHOD OF MAKING A BULK CATALYST

[76] Inventors: Mark E. Thompson; Venkatesan V. Krishnan; Alexandre G. Dokoutchaev, all of Department of Chemistry, University of Southern California, Los Angeles, Calif.

[21] Appl. No.: 09/272,905

[22] Filed: Mar. 19, 1999

[51] Int. Cl.[7] .............................. B01J 31/00; C01B 15/01

[52] U.S. Cl. ......................... 502/167; 423/584; 423/657; 502/171

[58] Field of Search .................................. 502/167, 171; 423/584

[56] References Cited

U.S. PATENT DOCUMENTS

5,480,629  1/1996  Thompson et al. ..................... 423/584
5,976,486  11/1999  Thompson et al. ..................... 423/584

Primary Examiner—Wayne Langel

[57] ABSTRACT

A process for making an improved bulk catalyst having a Group VIII metal, such catalyst being useful in producing $H_2O_2$ from $H_2$ and $O_2$ and/or in producing $H_2$ from water. The method incorporates the Group VIII metal within the "pillars" of the porous catalyst, without leaving a significant amount of the Group VIII metal on or near the outside surface of the catalyst, by hydrothermal incorporation of the Group VIII metal into the porous pillars.

9 Claims, 7 Drawing Sheets

Figure 1
Comparison - Kinetic studies for very long times
Methanol, dilute sulfuric acid media
Catalyst loading: 25 mg in 30 ml of media for PdB29hr
and 12.5 mg in 15 ml for PdB30HF1r Figure 2
Comparison, long time experiments, with catalysts, PdB26hr, PdB28hf1r, PdB28hf2r
Loading: 25 mg in 30 ml Figure 3
Comparison of $H_2O_2$ buildup inside bomb under various pressures vs reaction under open conditions, 1 atm
12.5 mg of PdB30hf1r in 15 ml (MeOH/sulfuric), both cases Figure 4
Comparison : Kinetics at 1 atm (0 psig) vs at 50 psig
Catalyst : PdB30hf1r, 12.5 mg/15 ml Figure 6
Comparison of $H_2O_2$ buildup in the reactor at different catalyst weight to medium volume ratio.
Catalyst: B2XHF2R in pure methanol with Conc. $H_2SO_4$ Figure 7
Comparison of loadings of PdB30hf1: 25 mg and 100 mg in 30 ml

METHOD OF MAKING A BULK CATALYST

FIELD OF THE INVENTION

This invention relates to a process for making an improved bulk catalyst having a Group VIII metal, such catalyst being useful in producing $H_2O_2$ from $H_2$ and $O_2$ and/or in producing $H_2$ from water.

BACKGROUND OF THE INVENTION

Group VIII metals, such as platinum or palladium, have been used extensively as catalysts. One such use has been as a catalyst for the reaction of hydrogen and oxygen to form hydrogen peroxide.

U.S. Pat. No. 5,480,629 uses Group VIII metals to catalyze the reaction of hydrogen and oxygen by forming pillars of alkyl bisphosphonic acid with dicationic bipyridinium (viologen) groups incorporated into the alkyl chain. These catalysts were prepared by first synthesizing a porous viologen-phosphonate material. The porous materials were either Zr or Hf complexes of $^{2-}O_3PCH_2CH_2$ viologen $CH_2CH_2PO_3^{2-}$ (PV), prepared as either bulk materials or thin films grown on high surface area supports. The positive charge of the viologen group gives the lattice a net positive charge, which is compensated by halide ions, found in the pores of the solid. These halide ions can be readily exchanged for metal salts (e.g. $MCl_4^{2-}$, M=Pd, Pt), however, complete exchange requires several treatments of the solid with solutions of the metal salt. The final step in the preparation of the catalyst is the reduction of the metal salt to a colloidal metal particle. The goal is to trap the metal particles within the pores of the material, such that they can catalyze electron transfer from hydrogen to viologen. Direct reduction of viologen with hydrogen is not possible. The reduced form of viologen will then react very rapidly with oxygen to produce hydrogen peroxide. While the procedure outlined above does make effective catalyst materials, the materials are not ideal. The ion exchange process fails to fully incorporate metal ions, since the metal ions themselves blocks the pores from further exchange as the level of metal incorporation gets high. The second, and more significant problem, is that the ion exchange process leave a significant amount of metal and metal salt on the outside of the particles. We have observed this by electron microscopic studies. The metal on the outside of the particle can engage in deleterious side reactions that significantly decrease the amount of hydrogen peroxide that is formed. Supported metals (e.g. Pd or Pt) will efficiently decompose hydrogen peroxide. In order to achieve the highest levels of peroxide and more generally to keep the catalysis reactions confined to a single site (viologen groups) it is important to prepare materials with little or no metal on the outside of the catalyst particles and significant amounts of metal within the pores of the materials.

SUMMARY OF THE INVENTION

The present invention is based on the use of Group VIII metals to catalyze the reaction of hydrogen and oxygen to hydrogen peroxide and/or catalyze the production of hydrogen from water. Specifically, we have found a method to incorporate the Group VIII metal within the "pillars" of the porous catalysts disclosed in U.S. Pat. No. 5,480,629 without leaving a significant amount of the Group VIII metal on or near the outside surface of the catalyst. In order to achieve the incorporation of the Group VIII metal within the "pillars" of the catalyst, we use hydrothermal incorporation of the Group VIII metal into the porous pillars. Specifically, our invention is, at least in part, predicated on the surprising discovery that a better way to introduce Group VIII metal ions into the catalyst structure is to do so prior to the formation of "pillars", or contemporaneously with, the formation of the "pillars".

Generally speaking, our process involves forming an aqueous solution of $(O_3P—R'—Y—R—PO_3)X_2$ in which R and R' are lower alkyl, X is halogen and Y is an aromatic ring system (hereinafter sometimes referred to as aqueous solution B). To this aqueous solution is added another aqueous solution containing a Group VIII metal salt of the formula (P)m (S) (T)n (hereinafter sometimes referred to as aqueous solution C) wherein P is an alkali metal, S is a Group VIII metal having an atomic number greater than 40, e.g. platinum, palladium or iridium, T is halogen, hydroxyl or cyanide, m is 2 or 3 and n is 4, 5 or 6. Aqueous solution B and aqueous solution C are combined with stirring until a water insoluble precipitate complex is formed (hereinafter sometimes being referred to as mixture G). We have found that the most desirable complexes formed in this reaction are the less soluble ones, e.g. having a solubility of less than about 0.05 molar at room temperature.

An aqueous solution of a water soluble salt of a Group IVA metal, e.g. titanium, zirconium or hafnium, and hydrofluoric acid is prepared (sometimes hereinafter referred to as aqueous solution A). Mixture G is added to aqueous solution A with continuous stirring and then heated. It is currently believed that the temperature should not exceed about 140° C., e.g. about 100° C. to about 140° C. and more preferably between about 125° C. to about 135° C. The heating is continued until formation of the bulk catalyst of this invention which is a porous structure having a Group VIII metal contained within the structure, the porous structure having the formula: $Zq(O_3P-R'—Y—R—PO_3)(X)p\,(PO_4)s$ wherein Z is a Group IVA metal, q is from 1 to 3, p is from 1 to 10, s is 0 to 1 and Y, R', R and X have the same meaning as set forth above. The particular catalysts produced by the method of the present invention are those described in U.S. Pat. No. 5,480,629 (incorporated herein by reference).

As noted previously, Y is an aromatic ring system, the preferred ring system having one or more tetravalent nitrogen atoms or may have oxygen atoms such as quinone or anthraquinone.

In one embodiment, each tetravalentnitrogen atom is a ring member in a separate aromatic ring system and two such ring systems, which can be of the same or different structure, are joined to one another directly through a covalent bond. Each such aromatic ring system can be a monocycle such as pyridine, pyrazine, or pyrimidine. Alternatively, each aromatic ring system can be a fused polycycle in which a pyridine, pyrazine, or pyrimidine ring is fused to one or more benzo or naphtho ring system, as for example quinolinium, isoquninolinium, phenanthridine, acridine, benz[h] isoquinoline, and the like.

The two aromatic ring systems, which can be of the same or different structure, alternatively can be linked through a divalent conjugated system as for example diazo (—N═N—), imino (—CH═N—), vinylene, buta-1,3-diene-1,4-diyl, phenylene, biphenylene, and the like.

In a further embodiment, the two conjugated cationic centers can be in a single aromatic system such as phynanthroline, 1,10-diazaanthrene, and phenazine.

Typical dicationic structures suitable as Y thus include 2,2-bipyridinium, 3,3-bipyridinium, 4,4-bipyridinium, 2,2-bipyrazinium, 4,4-biquinolinium, 4,4-biisoquninolinium, 4-[2-4-pyridinium)vinyl]pyridinium, and 4-[4-(4-pyridinium)phenyl]pyridinium.

Other organic moities include anthraquinone and napthaquinone as well as other moities disclosed in U.S. Pat. No. 2,369,912; U.S. Pat. No. 2,673,140; British Patent 686,657 and Goor, G. in "Catalytic Oxidation With $H_2O_2$ as Oxidant", (G. Strukel, Ed. P, Chap. 2. Kluwer Academic, Norwell, Mass., 1992, which patents and publications are incorporated, in their entirety, herein by reference.

It is our present belief that the amount of $(O_3P-R'—Y—R—PO_3)X_2$ relative to the amount of the Group VIII metal salt to form the water insoluble precipitate complex is not particularly critical. Generally speaking, the mole ratio of salt to P can vary widely, e.g. from about 0.5 to about 10.

The presence of HF is important because it renders the catalyst crystalline; however, the amount of HF is not particularly critical because increasing the concentration does not, to any great extent, improve the crystallinity. In general, the molar ratio of HF to the Group IV(a) salt may be between about 1 and 20, preferably between about 1 and 10 and more preferably between about 3 and 7.

In order to improve the porosity of the bulk catalyst of the present invention, it is sometimes desirable to include in aqueous solution B a lower alkyl phosphonate, e.g. methyl or ethyl phosphonate, or phosphoric acid. Generally, it is preferred if the lower alkyl phosphonate or phosphoric acid is present in an amount of from about 0.5 moles to about 2 moles based on the amount of $(O_3P-R'—Y—R—PO_3)X_2$ wherein R', R and X have the same meanings as before.

Turning now to the Group IVA water soluble salt, it is thought that the particular type of salt is not important, providing it is water soluble. The presently preferred salt has the formula $Z—(O)_t (X)_2$ wherein Z is a Group IVA metal, t is 0 or 1, and X is halogen.

As noted previously, mixture G is added, with stirring, to aqueous solution A. The relative amounts of mixture G and solution A are not critical; however, generally speaking it is preferred if one mole of mixture G (based on the amount of Group IVA metal salt) is added for from 1 mole to 5 moles of the water soluble salt of the Group IVA metal present in aqueous solution A.

DETAILED DESCRIPTION OF THE INVENTION

The following salts were tested as possible candidates to form PV-MX complex: $Na_2PdCl_4$, $K_2PdCl_6$, $K_2PtCl_4$, $K_2PtCl_6$, $KAuCl_4$, $KAuBr_4$, $KAu(CN)_2$, $K_3Co(CN)_6$, $K_3IrCl_6$, $K_2IrCl_6$, $K_3RhCl_6$, $K_3RuCl_6$, $K_2ReCl_6$.

5 mL volumes of $6 \cdot 10^{-2}$ M solutions of PV and PGM salt were mixed. This overall concentration was chosen because it corresponds to one in Teflon bomb.

The rate of precipitate formation varies strongly for different salts. So, $Na_2PdCl_4$, $KAuCl_4$ and $KAuBr_4$ instantly form precipitate. Fast (several seconds) reaction is observed in case of $K_2PtCl_6$ and $K_2PdCl_6$. Very slow formation (several days) occurs for $K_3IrCl_6$, $K_2ReCl_6$, $K_2PtCl_4$ and $KAu(CN)_2$. And there is no precipitation at all for mixtures of PV and $K_3RuCl_6$, $K_3Co(CN)_6$ or $K_3RhCl_6$.

Finally, by preparing very concentrated (0.2 M) of PV and saturated solutions of PGM salts we obtained precipitates with $PdCl_6^{2-}$ (brown), $PdCl_4^{2-}$ (light brown), $PtCl_6^{2-}$ (yellow—orange), $PtCl_4^{2-}$ (yellow), $IrCl_6^{2-}$ (dark reddish brown), $RuCl_3$ (black).

The final procedure established for hydrothermal PGM incorporation is described below.

For big Teflon bomb (total volume 45 mL) the following mixtures are prepared:

Mixture A: 1. 14 mM (467 mg) of $HfOCl_2.8H_2O$ is dissolved in 20 mL of $H_2O$ directly in the bomb. 5.7 mM (183 µL of 48% HF) for 5× or 11.4 mM (366 µL of 48% HF) is added.

Mixture B: 1—0.57 mM (249 mg) of PV is dissolved in 7 mL of $H_2O$, 0.57 mM (39 µL of 85% $H_3PO_4$) is added. 2-PGM salt (0.57 mM, or 167 mg in case of $Na_2PdCl_4$) is dissolved in 7 mL of $H_2O$ and slowly mixed with PV-PA solution stirred by ultrasound.

Mixture B is added to Mixture A under continuous ultrasound stirring, bomb sealed and put in the oven for 5–7 days at 125–130° C.

Prepared catalyst was washed several times with water, than with methanol and acetone. Reduction conditions are the same as for ion exchanged catalysts.

The exact amounts of chemicals used in above-mentioned syntheses are regrouped in Table 2.

TABLE 2

Quantities of chemicals used in hydrothennal syntheses of HFPOPV

| | Mixture A | | | Mixture B1 | | | Mixture B2 | | Reaction | |
| --- | --- | --- | --- | --- | --- | --- | --- | --- | --- | --- |
| Batch Name | $HfOCl_2$ mM | HF mM | $H_2O$ mL | PV mM | $H_3PO_4$ mM | $H_2O$ mL | $Na_2PdCl_4$ mM | $H_2O$ mL | time, days. | Temperature, ° C. |
| PdB26H | 0.57 | 2.85 | 7 | 0.285 | 0.285 | 5 | 0.285 | 5 | 5 | 125 |
| PdB28HF1 | 1.14 | 5.7 | 20 | 0.57 | 0.57 | 7 | 0.143 | 7 | 7 | 130 |
| PdB28HF2 | 1.14 | 1.14 | 20 | 0.57 | 0.57 | 7 | 0.143 | 7 | 7 | 130 |
| PdB29H | 2.28 | 11.4 | 20 | 1.14 | 1.14 | 7 | 1.14 | 7 | 5 | 125 |
| PdB30HF1 | 1.14 | 5.7 | 20 | 0.57 | 0.57 | 7 | 0.57 | 7 | 6 | 125 |
| PdB2xHF2 | 1.14 | 11.4 | 7 | 0.57 | 0.57 | 5 | 0.57 | 5 | 5 | 125 |

TEM studies as well as XRD patterns obtained for catalysts clearly indicate following facts:

Obtained structure remains crystalline, but these compounds are short range crystalline. Increasing of HF concentration does not help very much to improve crystallinity (see FIG. 1). From other side, $H_2O_2$ yields obtained from these catalysts indicate interaction between Pd and PV sites is more important than long range crystallinity.

PGM aggregates are distributed more homogeneously through all the volume of these crystals and are not located mainly on the surface like it was in case of ion exchange.

EDX analysis shows next approximate ratios of main elements: P to Hf is always in range 2–2.5, PGM to P ratio varies from 0.3 to 0.1) as function of two conditions: initial PGM salt/viologen ration in reaction mixture and nature of metal and its particular form (salt). Last value, confirmed by ICP; is twice less then after ion exchange.

We obtained PGMHfPOPV structures for 3 PGM: Pd, Pt and Ir. All these compounds have very different behavior from catalytic activity point of view. Pd is excellent catalyst. Pt compound gives a low $H_2O_2$ yield because of probable catalytic $H_2O_2$ decomposition on Pt nanoaggregates. Ir compound failed at reduction step but is useful in $H_2$ production. Reduction by $H_2$ bubbling at 80° C. during 3 hours did not change the color of catalyst as usual (from yellowish—brown color of ions to gray—black color of reduced metal). Color just became slightly darker that indicates the absence or low concentration of reduced metal.

Hydrogen Peroxide Production from Specific Catalysts

Figure 1:
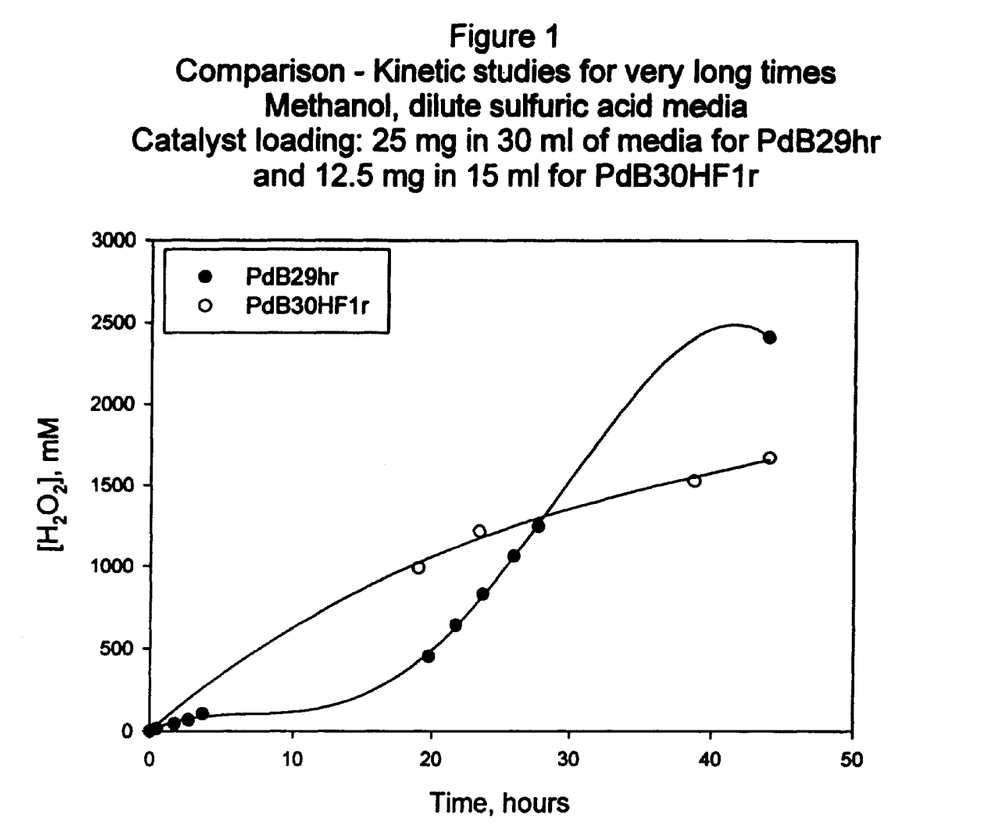
FIG. 1 shows kinetic studies of $H_2O_2$ production for various catalysts.
Figure 2:
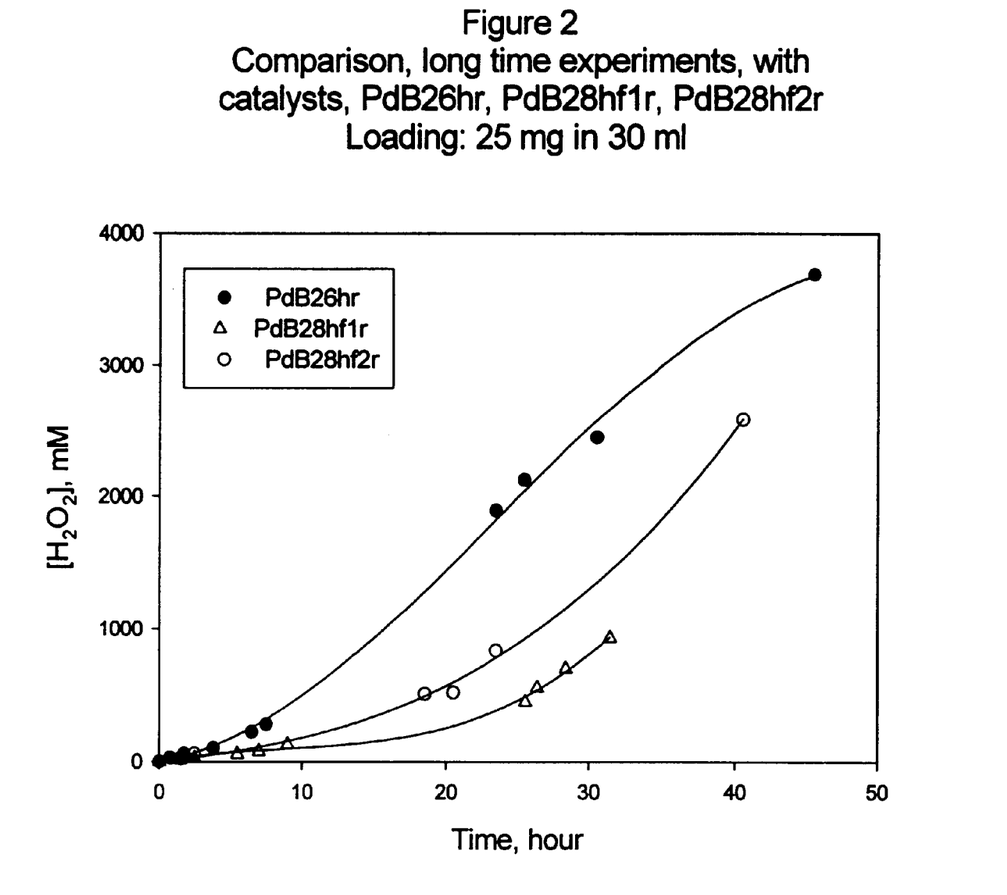
FIG. 2 shows $H_2O_2$ production for three catalysts.

I. Atmospheric pressure experiments conducted over long times (over 24 hours)—FIGS. 1, 2, 6 and 7: In such cases, the experiments were carried out simply in a 50 ml centrifuge tube with a slurry of the catalyst in the appropriate reaction media, through which a continuous bubbling of pure hydrogen and oxygen is maintained. The flow rate of hydrogen is about 20 cc/min and that of oxygen is about 200 cc/min. The reaction media is composed of 10 ml of 0.1M sulfuric acid with 20 ml of anhydrous methanol (FIGS. 1 and 2).

We have also carried out kinetics using 30 ml methanol with 51 μl of concentrated sulfuric acid as the reaction medium. This medium has no more than 1 or 2% water (from commercial concentrated sulfuric acid). The oxygen stream is passed through a bubbler, containing methanol prior to entering the reactor, in order to prevent excessive loss of methanol from the reactor.

The advantages of the concentrated sulfuric acid with anhydrous methanol mixture are, primarily—enhancement of oxygen and hydrogen solubility, the detection of small quantities of the undesired product, i.e. water by GC, and the possible enhancement in liquid film mass transfer coefficient, which could be a rate determining step during our kinetic process. The absolute lack of water in the starting mixture makes it very easy to detect the presence of water (by Gas Chromatography) as the product of undesirable reaction.

II. Experiments conducted at higher pressures (FIGS. 3, 4 and 5: The production of hydrogen peroxide was investigated in a sealed, stirred, teflon bomb (Parr) which was maintained at a high pressure by a pressure relief valve set at the desired value, located downstream of the reactor. A continuous flow of hydrogen and oxygen was maintained using mass flow controllers. We also have the option of flushing the gas phase by nitrogen for safety, to ensure that the flammability limits for hydrogen are enhanced. The flow rate of hydrogen was about 15 cc/min and that of oxygen, about 200 cc/min. In such a case, with such a small quantity of catalyst, we found that we were able to carry out the experiment at hydrogen partial pressures (between 5 and 10%) slightly larger than the explosive limit for hydrogen-oxygen mixtures (about 4% under room temperature conditions).

Our protocol for this experiment is as follows. Firstly, we bubble the oxygen at high flow rate into the reactor until the desired pressure is reached and a steady flow is measured by an electronic flow meter (Omega 1700) located upstream of the pressure relief valve and downstream of the reactor. Then we introduce the hydrogen gas gradually, through a second flow control-needle valve. The hydrogen flow rate is set by a mass flow controller (Porter 201) and is constant throughout the experiment.

The catalyst slurry was kept in a small centrifuge tube inside the reactor, so as to avoid contact of the reaction media with the stainless steel shaft (rotor) and thetmocouple. The possibility of rust contamination was an overwhelming concern, and this was the only configuration available, which gave us stable hydrogen peroxide production. The reactor assembly was also mounted on a stirrer plate with a magnetic stirrer inside the centrifuge tube to create the agitation. Once we get an opportunity to scale this up, we will be able to use the rotor shaft for mechanical agitation.

The most important catalysts used in hydrogen peroxide production by the direct combination of hydrogen and oxygen were the following and their kinetic performance is listed in the following examples:

1. PdB26hr
2. PdB28HFlr
3. PdB28HF2r
4. PdB29hr
5. PdB30HFlr
6. PdB2xHF2r

These catalysts have been characterized for their metal dispersion and their crystal sizes, using TEM. Their crystal structure has been confirmed to be that, which has been described in earlier references,[2] from powder XRD measurements. ICP-MS has been used to determine the overall Pd loading and the Pd to P ratios. The quantity of P in the material is an indicator of the loading of viologen in the material, as the ratio of P to Viologen is 3:1, assuming the material is pure.

The kinetic data available for the above mentioned experiments are shown in FIGS. 1 through 8. The use of methanol with sulfuric acid as opposed to the acetone-sulfuric acid media has its advantages. From our earlier work, we have established that, the yield of hydrogen peroxide from the methanol-sulfuric acid mixture is very close to that obtained from the acetone-sulfuric acid. Methanol being less volatile may used for longer reaction times, particularly, when it is necessary to run the reaction overnight.

Production of Hydrogen Peroxide with Time Using dil. Sulfuric Acid-methanol Media The behavior of catalysts, PdB26hr, PdB28HFlr, PdB28HF2r, PdB29Hr and PdB30HFlr, under open atmospheric conditions, are shown in FIGS. 1 and 2. The production of over 3.5 M $H_2O_2$ (11.5% by weight) in about 45 hours for PdB26Hr is quite encouraging. No deactivation of any sort was observed during such long periods of constant reaction. Other catalysts show anywhere from over 1M (3.36% by wt) $H_2O_2$ to 3M (9.85% by wt) $H_2O_2$ and exhibit no deactivation. The medium for these experiments is ~0.1M $H_2SO_4$ (10 ml) mixed with methanol (20 ml). The weight of the catalysts used is 25 mg.

Figure 3:
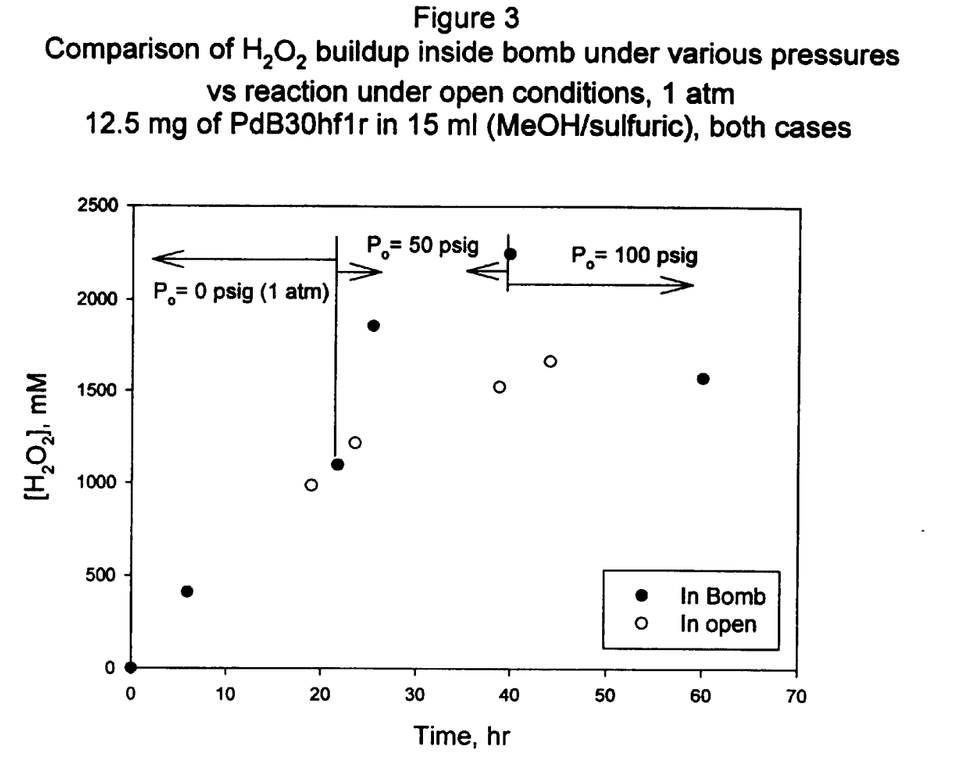
FIG. 3 shows $H_2O_2$ buildup under various pressures compared with one atmosphere.

The effect of increase of pressure on the kinetics has been shown in FIG. 3, using PdB30HF1R, as a representative catalyst. Although the scale of the experiments has been halved, care is taken to ensure that the ratio of the catalyst weight to medium volume is the same (0.833 mg/ml). As before, the ratio of 0.1 M sulfuric acid to pure methanol is the same, as in the previous run. For about 23 hours, the reaction was carried out in the bomb at 1 atm. The concentration of peroxide reached 1.2 M, when the pressure was increased to 50 psig. The sharp increase in concentration shown in FIG. 3 indicates a definite enhancement in the rate of hydrogen peroxide production. However, after 40 hours upon increasing the pressure to 100 psig, there is a drop—a case of deactivation!

Figure 4:
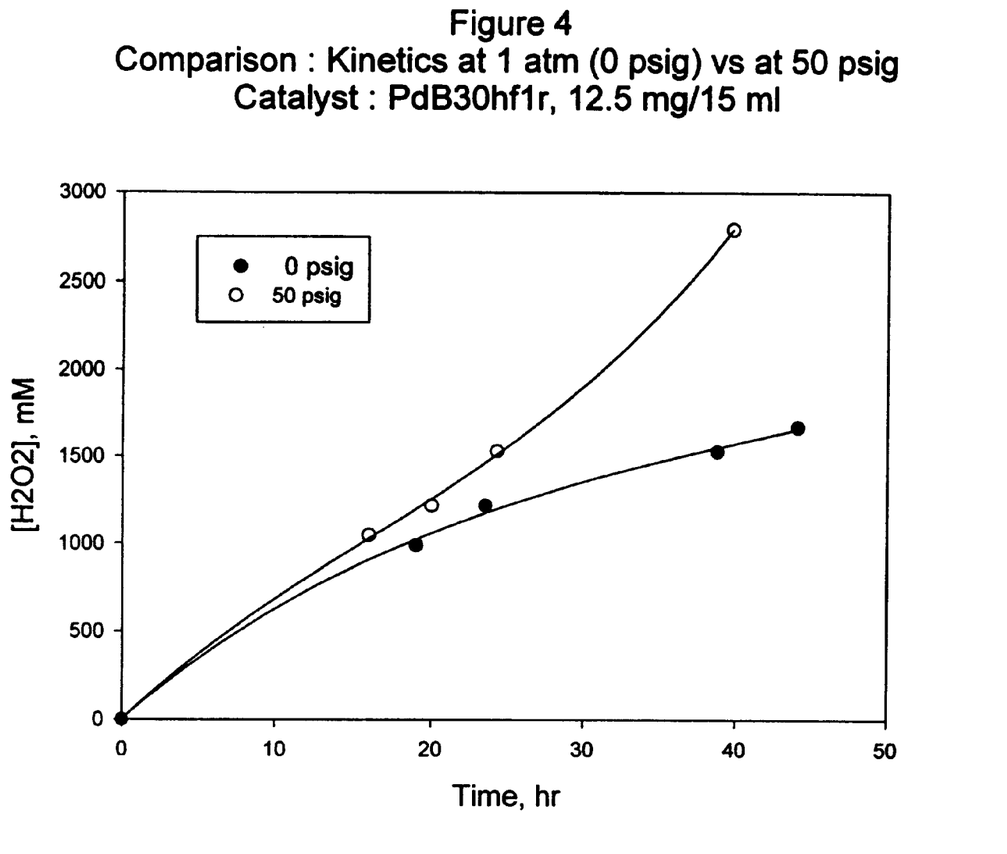
FIG. 4 shows $H_2O_2$ production at different pressures.
Figure 5:
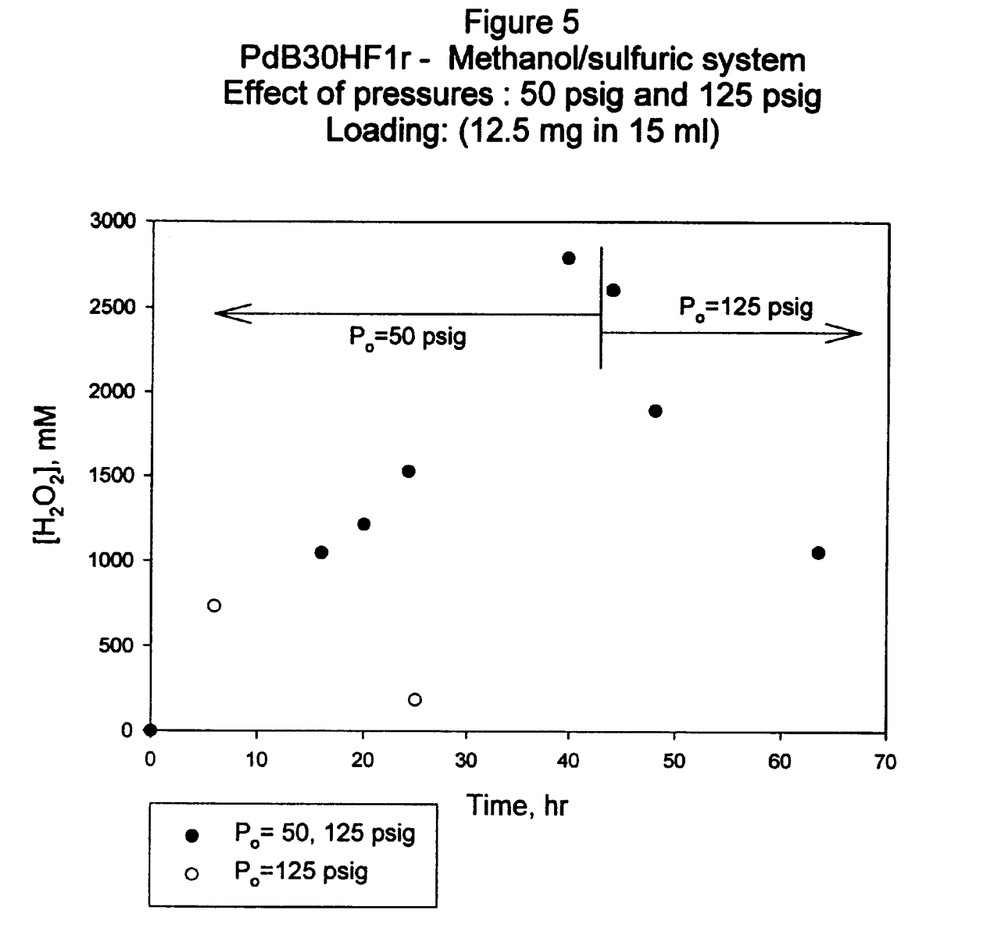
FIG. 5 shows the effect of pressure.

To conclusively show the effect of pressure (up to 50 psig) on the reaction rate, observe FIGS. 4 and 5. FIG. 4 shows a higher yield of hydrogen peroxide being produced over time, as compared to the same experiment conducted in open air. FIG. 5 shows the same trend as in FIG. 3. Up to 50 psig, the reaction proceeds well, producing hydrogen peroxide to about 2.7M (8.87% by wt) but after the pressure goes up to 125 psig, there is rapid deactivation. A fresh experiment conducted at 125 psig shows tremendously higher initial rates, but then shows rapid deactivation.

Production of Hydrogen Peroxide with Time using conc. Sulfuric Acid-methanol Media (no water)

We can ensure the same concentration of $H^+$ ions by adding to 30 ml of anhydrous methanol, 51 $\mu$l of concentrated sulfuric acid.

Figure 6:
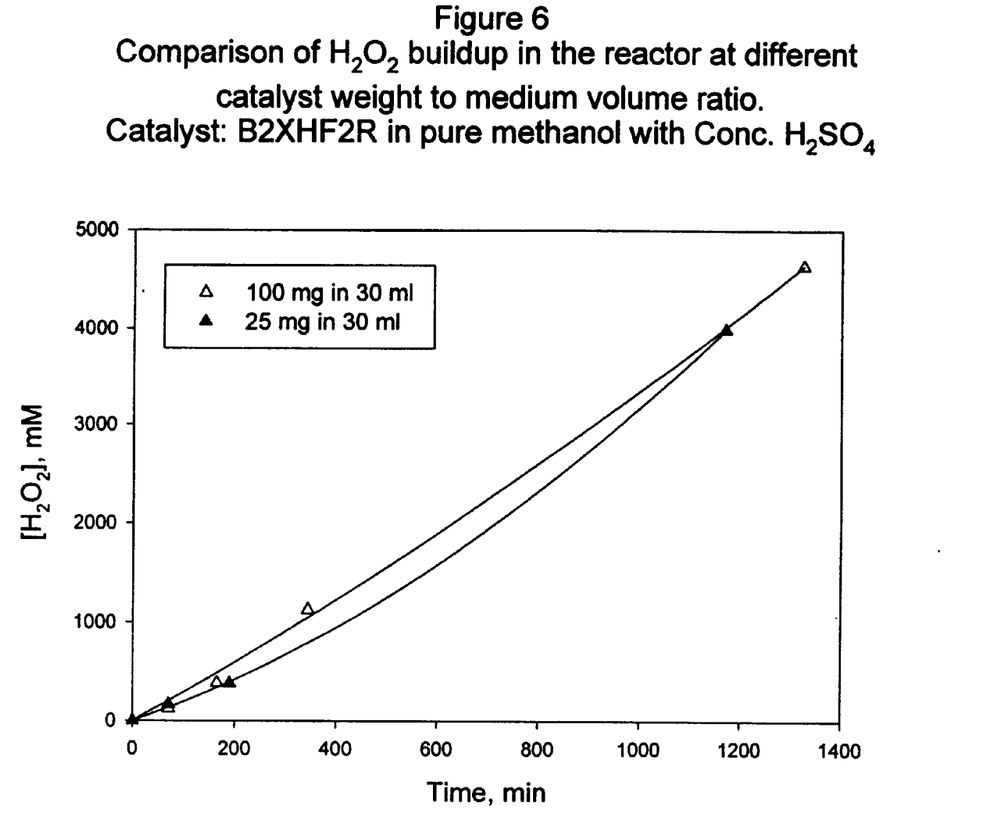
FIG. 6 is a comparison of $H_2O_2$ buildup with different weights of catalysts.
Figure 7:
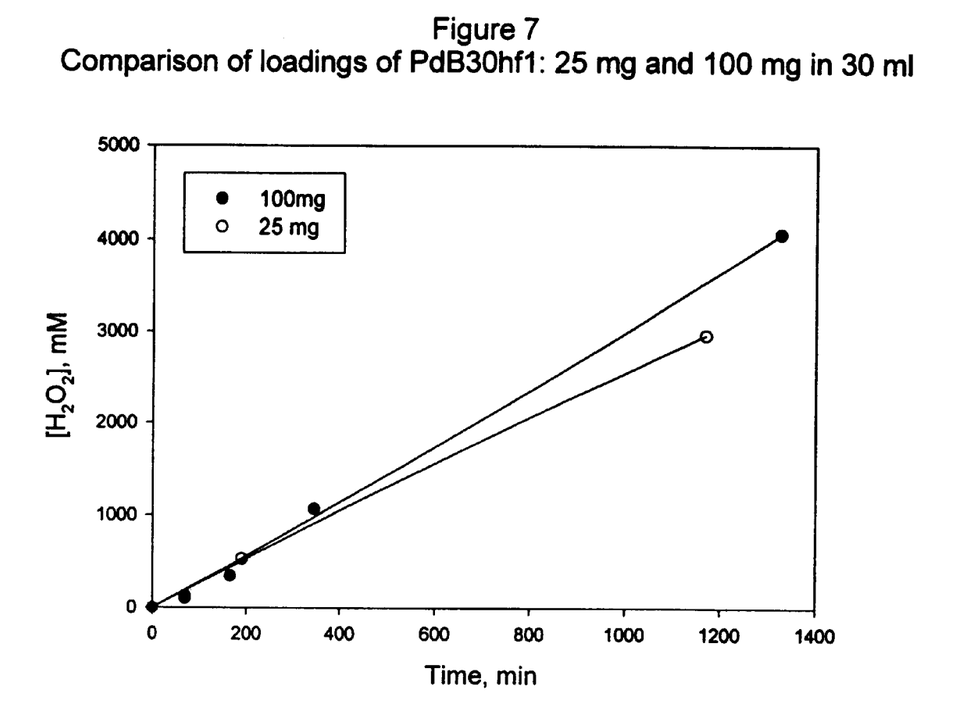
FIG. 7 compares different loading of a catalyst on $H_2O_2$ production.

FIGS. 6 and 7 demonstrate conclusively, that the use of an anhydrous reaction medium, increased the reaction rate drastically and now we are getting 3.5 to 4 M of hydrogen peroxide with 20–25 hours of reaction. Contrast that with FIGS. 1 through 5, where, we had to go over 30 hours, to get as much peroxide. Of course, it must be always borne in mind that as peroxide levels go closer to steady state, the selectivity of the peroxide will go down and will approach 50%.

FIGS. 6 and 7 also show that the change of catalyst weight (25 mg and 100 mg) to medium volume has made little impact on the reaction rates. Keeping the medium volume constant, the weights of the catalyst have been varied. We have shown this phenomena to be valid for two catalysts B2XHF2R and PdB30HF1R. This evidence points to the fact that the liquid film mass transfer process could be rate determining, notably during the early times. In such a case, if the gas holdup in the liquid media is high, then the surface area of the gas-liquid interface will be low. The effective gas-liquid mass transfer coefficient will be fairly low—so low that despite small enhancements in the solid active sites, there would be little enhancement in the rates of reaction.

We claim:
1. A method for making a bulk catalyst which comprises (a) forming an aqueous solution of a water solution salt of a Group IVA metal and hydrofluoric acid; (b) forming an aqueous solution of $(O_3P-R'—Y—R—PO_3)X_2$ wherein R' and R are lower alkyl, X is halogen and Y is an aromatic ring system; (c) forming an aqueous solution of (P)m (S) (T)n wherein P is an alkali metal, S is a Group VIII metal having an atomic number greater than 40, T is halogen, hydroxyl or cyanide, m is 2 or 3 and n is 4, 5 or 6; (d) mixing aqueous solution (b) with aqueous solution (c) with stirring until an insoluble precipitate is formed; (e) and mixing the composition formed in step d with the aqueous solution (a) and heating, with stirring, at a temperature of between about 125° C. to 150° C. until the reaction between the composition formed in step d and aqueous solution (a) is substantially complete.

2. A method according to claim 1 wherein Y is a divalent aromatic group containing at least two conjugated tetravalent nitrogen atoms.

3. A method according to claim 2 wherein in Y each tetravalent nitrogen atom is a ring member in separate aromatic ring systems which ring systems are joined to one another directly or through a conjugated hydrocarbon chain.

4. A method according to claim 3 wherein each aromatic ring system is a monocycle or fused polycycle comprising pyridine, pyrazinc, or pyrimidine ring each of which monocycle or fused polycycle with alkyl of 1 to 6 carbon atoms.

5. A method according to claim 1 wherein S is platinum, palladium or iridium.

6. A method according to claim 5 wherein T is halogen.

7. A method according to claim 6 wherein T is chlorine or bromine.

8. A method according to claim 1 wherein the aqueous solution of step (b) contains a member selected from the group consisting of lower alkyl phosphonate and phosphoric acid.

9. A method according to claim 8 wherein the aqueous solution of step (b) contains phosphoric acid.

* * * * *

UNITED STATES PATENT AND TRADEMARK OFFICE
CERTIFICATE OF CORRECTION

| | | |
|---|---|---|
| PATENT NO. | : 6,143,688 | |
| APPLICATION NO. | : 09/272905 | |
| DATED | : November 7, 2000 | |
| INVENTOR(S) | : Mark E. Thompson et al. | |

It is certified that error appears in the above-identified patent and that said Letters Patent is hereby corrected as shown below:

At Column 1, line 3, the following heading and text should be inserted:

-- UNITED STATES GOVERNMENT RIGHTS
This invention was made with government support under Contract No. F49620-96-1-0035 awarded by the Air Force Office of Scientific Research. The government has certain rights in the invention. --

Signed and Sealed this

Tenth Day of February, 2009

JOHN DOLL
*Acting Director of the United States Patent and Trademark Office*